(12) United States Patent
Harima et al.

(10) Patent No.: US 6,805,398 B2
(45) Date of Patent: Oct. 19, 2004

(54) STRUCTURE OF TAIL GATE

(75) Inventors: Issei Harima, Higashihiroshima (JP); Naoyuki Ikemizu, Higashihiroshima (JP); Koichiro Yamaguchi, Aki-gun (JP); Chikashi Kawamoto, Aki-gun (JP); Kimito Sato, Aki-gun (JP)

(73) Assignee: GP Daikyo Corporation, Hiroshima (JP)

( * ) Notice: Subject to any disclaimer, the term of this patent is extended or adjusted under 35 U.S.C. 154(b) by 0 days.

(21) Appl. No.: 10/388,109

(22) Filed: Mar. 13, 2003

(65) Prior Publication Data

US 2003/0173796 A1 Sep. 18, 2003

(30) Foreign Application Priority Data

Mar. 13, 2002 (JP) .......................................... 2002-068581
Jun. 24, 2002 (JP) .......................................... 2002-183321

(51) Int. Cl.$^7$ ................................................. B60J 5/00
(52) U.S. Cl. ................................. 296/146.7; 296/146.8; 296/50; 49/503
(58) Field of Search ............................. 296/50, 146.5, 296/146.7, 146.8; 49/502, 503

(56) References Cited

U.S. PATENT DOCUMENTS

| 6,378,251 | B2 | * | 4/2002 | Fukumoto et al. ............. 49/503 |
| 6,416,106 | B2 | * | 7/2002 | Ponziani .................. 296/146.8 |
| 6,431,638 | B1 | * | 8/2002 | Mrozowski et al. ...... 296/146.8 |
| 6,571,516 | B2 | * | 6/2003 | Nakamoto et al. ............. 49/503 |
| 6,626,482 | B2 | * | 9/2003 | Barr et al. ................ 296/146.7 |
| 2001/0029704 | A1 | * | 10/2001 | Nakamoto et al. ............. 49/503 |
| 2002/0024234 | A1 | * | 2/2002 | Ishikawa et al. ......... 296/146.8 |
| 2003/0071481 | A1 | * | 4/2003 | Igarashi et al. ........... 296/146.5 |
| 2003/0107235 | A1 | * | 6/2003 | Komatsu et al. .......... 296/146.5 |
| 2003/0177796 | A1 | * | 9/2003 | Dimig .......................... 49/503 |
| 2004/0041438 | A1 | * | 3/2004 | Simon et al. ............. 296/146.7 |

* cited by examiner

*Primary Examiner*—Lori L Coletta
(74) *Attorney, Agent, or Firm*—Merchant & Gould P.C.

(57) ABSTRACT

A structure of a tail gate is formed by bonding peripheral edge portions of an inner panel and an outer panel to each other, and covering a rear portion of a vehicle body so the tail gate is able to freely open and close. A cover is arranged in an inner side of the inner panel, and a lock apparatus is provided with a latch capable of engaging with a striker fixed to a vehicle body. The lock apparatus is disposed between the inner panel and the cover.

9 Claims, 16 Drawing Sheets

STRUCTURE OF TAIL GATE

BACKGROUND OF THE INVENTION

1. Field of the Invention

The present invention relates to a structure of a tail gate which covers a rear portion of a vehicle body so as to freely open and close the rear portion of the vehicle body.

2. Description of the Background Art

As is well known, an opening and closing body provided at a rear end of a vehicle such as an automobile or the like, so-called lift gate, tail gate, rear gate, backdoor or the like (hereinafter, these opening and closing bodies are generally called as a "tail gate"), which covers an opening of a rear end portion of a vehicle body so as to freely open and close the opening in a vertical direction is normally formed by combining an inner plate member (an inner panel) and an outer plate member (an outer panel), forming a space portion (a panel space portion) between both elements and bonding peripheral edge portions and their vicinities of both of the panels to each other. In this case, an inner side of the inner panel facing to an interior side of a passenger room is generally covered by a cover (an interior trim) which is, for example, formed by a synthetic resin.

In such a tail gate, as a locking and unlocking mechanism of the tail gate, there is normally arranged a lock mechanism provided with a latch capable of engaging with a striker fixed to a vehicle body. The lock mechanism generally includes a so-called mechanical type lock mechanism which is provided with a latch assembly, a key cylinder assembly and a handle assembly as basic constituting elements. The latch assembly has a latch capable of engaging with a striker fixed to the vehicle body. The key cylinder assembly is to switch lock and unlock states of the latch assembly from an external side on the basis of a key operation. And the handle assembly is to switch engagement and disengagement states of the latch with respect to the striker from the external side on the basis of a handle operation.

In this locking and unlocking mechanism, the key cylinder assembly and the handle assembly are connected to the latch assembly via a key cylinder rod and a handle rod respectively.

In mounting such a locking and unlocking mechanism to the tail gate, conventionally, it is common to all of a basic constituting element such as each assembly above mentioned and each connecting rod are arranged within a panel space formed between the inner panel and the outer panel. That is, the above-mentioned each constituting element is covered with only one panel (the outer panel) with respect to the outer side thereof.

However, in this conventional construction, even when the tail gate is closed and the latch assembly is locked, it is relatively easy to unlock the key cylinder rod illegally by bursting through the only one panel (the outer panel) so as to pierce a hole from the outer side of the vehicle, for example, by using a pointed hard rod-like body or the like. That is, there is a problem that the lock can be illegally celled for a relatively short time.

Further, recently, the thickness of steel panels forming the vehicle body is determined to be thinner as possible to reduce the weight of the vehicle body that is requested from a view point of saving fuel cost. In the case of the outer panel of the tail gate, its thickness is set to be very thin, for example 0.7 mm. Thereby, the outer panel is pierced more easily from the outer side of the vehicle. Furthermore, a tail gate of which both of inner and outer panel are made of synthetic resin is getting to be employed in practical use.

Furthermore, recently, a so-called keyless entry system, passive keyless entry system or the like are know and are already employed in practical use. They directly drives a latch driving actuator of the latch assembly in accordance with a remote control utilizing mainly a wireless communication means or the like so as to switch the lock and unlock states of the latch assembly.

These systems using remote control do not require key itself, therefore, key cylinder and key cylinder rod are not provided. Even in such a system, it is possible to unlock illegally the latch assembly, by bursting through the outer panel so as to pierce a hole and operating directly the latch assembly from the outer side of the vehicle.

Against such an illegal unlocking, it may be considered to cover the outside of the latch assembly by a separate cover member. However, in this case, there arise some problems such that number of parts is increased, a complex assembly process is required in order to mount the cover member and inner structure of the tail gate become to be complicated.

In the vehicle in which a rear portion of the vehicle body is covered so as to freely open and close by the tail gate as mentioned above, a license plate (a so-called number plate) of the vehicle is often mounted to the tail gate. Accordingly, in this case, a lamp (a so-called license lamp) for lighting up the number plate in the night or the like is also mounted to the tail gate.

In the case that the license plate is mounted to the tail gate, it is general that an opening portion is provided at least in the outer panel of the tail gate, and a license lamp unit is mounted to the opening portion. In this case, the license lamp must be detachably mounted for a maintenance such as a replacement of the lamp or the like. That is, the license lamp unit is detachably mounted to the opening portion, for example, by using screw members or the like.

Accordingly, the key cylinder rod in an inner portion of the tail gate can be easily operated from the outer side of the vehicle through the opening portion, for example, by detaching the screw members or the like so as to detach the license lamp unit. That is, even in a state in which the tail gate is dosed and the latch assembly is locked, the key cylinder rod is easily unlocked illegally from outer side of the vehicle through the opening portion by detaching the license lamp unit from the opening portion. As a result, the lock of the latch assembly can be easily and illegally cancelled for a short time.

SUMMARY OF THE INVENTION

This invention is made to resolve the above-mentioned technical problems. A first basic object of the present invention is to make it harder to carry out an illegal locking and unlocking operation with respect to a tail gate, with a relatively simple constitution and without increasing number of parts. And a second basic object of the present invention is to prevent a key cylinder rod from being operated from outer side of the vehicle through an opening portion for mounting a license lamp unit to a tail gate even when it is detached from the opening portion.

In accordance with a first aspect of the present invention, there is provided a structure of a tail gate formed by bonding peripheral edge portions and their vicinities of an inner panel and an outer panel to each other, and covering a rear portion of a vehicle body so as to freely open and dose, wherein a cover is arranged in an inner side of said inner panel, and wherein a lock apparatus provided with a latch capable of engaging with a striker fixed to a vehicle body is disposed between said inner panel and said cover.

According to the structure mentioned above, the lock apparatus having the latch capable of engaging with the striker fixed to the vehicle body is arranged between the inner panel and the cover body. That is, the lock apparatus is covered by two panel members (the inner and outer panel members) in an outer side thereof. As a result, even in the case of bursting through the outer panel from the external side of the vehicle, for example, by a pointed hard rod-like body or the like in a state in which the tail gate is closed and the lock apparatus is locked, the lock member can not be unlocked until further bursting through the inner panel so as to pierce a hole. That is, in comparison with the conventional structure in which the outer side of the lock apparatus is covered by only one outer panel, it is hard to illegally unlock and it is possible to effectively prevent a theft damage.

In this case, it is possible to make it harder to carry out an illegal locking and unlocking operation with respect to a tail gate, without increasing number of parts, by employing a relatively simple constitution in which the lock apparatus is disposed at inner side than the inner panel.

In one embodiment of the present invention, the above-mentioned lock apparatus is provided with a latch assembly having a latch capable of engaging with the striker fixed to the vehicle body and a key cylinder assembly connected to said latch assembly via a key cylinder rod, and wherein said key cylinder rod is substantially extended between the key cylinder assembly and the latch assembly within a space between the inner panel and the cover.

In this case, the key cylinder rod connects the key cylinder assembly to the latch assembly substantially extending between the key cylinder assembly and the latch assembly in the space portion formed between the inner panel and the cover body. That is, the key cylinder rod is covered by two panel members (the inner and outer panel members) in an outer side thereof. As a result, even in the case of bursting through the outer panel from the external portion, for example, by a pointed hard rod-like body or the like in a state in which the tail gate is closed and the latch assembly is locked, the key cylinder rod can not be unlocked until further bursting through the inner panel so as to pierce a hole. That is, in comparison with the conventional structure in which the outer side of the key cylinder rod is covered by only one outer panel, it is hard to illegally unlock and it is possible to effectively prevent a theft damage.

In this case, it is possible to make it harder to carry out an illegal locking and unlocking operation with respect to a tail gate, without increasing number of parts, by employing a relatively simple constitution in which the key cylinder rod is disposed at inner side than the inner panel.

In one embodiment of the present invention, vertical walls protruding at least from any one of said inner panel and the outer panel are disposed at both sides of said latch assembly in a widthwise direction of the vehicle body.

In this case, it is possible to effectively prevent the illegal operation against the latch assembly from the side portion in the widthwise direction of the vehicle.

In one embodiment of the present invention, a cover wall extending between said latch assembly and the outer panel is disposed in a rear side of said latch assembly in a longitudinal direction of the vehicle body.

In this case, it is possible to effectively prevent the illegal operation against the latch assembly from the rear side of the vehicle.

In one embodiment of the present invention, a support portion for supporting said key cylinder assembly is provided at least in any one of said inner panel and the cover.

In this case, the key cylinder assembly is supported by the support portion. Thereby, the key cylinder assembly does not drop out easily even in the case that the impact is applied to the key cylinder, also thereby making it harder to carry out an illegal locking and unlocking operation.

In accordance with a first aspect of the present invention, there is provided a structure of a tail gate formed by bonding peripheral edge portions and their vicinities of an inner panel and an outer panel to each other, and covering a rear portion of a vehicle body so as to freely open and close, wherein an opening portion for mounting a license lamp unit is formed at least in any one of said inner panel and the outer panel, said license lamp unit is detachably mounted to said opening portion, wherein a lock apparatus provided with a latch assembly having a latch capable of engaging with a striker fixed to a vehicle body and a key cylinder assembly connected to said latch assembly via a key cylinder rod extending in an inner side at least from said outer panel is arranged at least in an inner side of said outer panel, and wherein a protection wall for regulating an access to said key cylinder rod is provided between said opening portion and said key cylinder rod.

According to the structure mentioned above, since the protection wall for regulating the access to the key cylinder rod is provided between the key cylinder rod and the opening portion for mounting the license lamp unit, the access to the key cylinder rod from the opening portion is regulated by the protection wall even when the license lamp unit is taken out from the mounting opening portion, it is hard to carry out the illegal unlocking operation of the key cylinder rod from the opening portion, and it is possible to increase the theft prevention effect.

In one embodiment of the present invention, the protection wall is provided with a pair of left and right standing walls protruding from both of left and right sides of said opening portion toward the inner side of the tail gate, and a standing wall protruding at least from a side corresponding to said key cylinder rod in both of the upper and lower sides of said opening portion toward the inner side of the tail gate.

In this case, since the protection wall is provided with a pair of left and right standing walls protruding from both of the left and right sides of the opening portion toward the inner side of the tail gate, and the standing wall protruding toward the inner side of the tail gate at least from the side corresponding to the key cylinder rod in both of the upper and lower sides of the opening portion, the access to the key cylinder rod from the opening portion can be securely regulated.

In one embodiment of the present invention, the protection wall is provided with a standing wall extending substantially along said key cylinder rod at least in a side corresponding to said opening portion of said key cylinder rod, and protruding toward the inner side of the tail gate.

In this case, the protection wall is provided with the standing wall extending substantially along the key cylinder rod at least in the side corresponding to the opening portion of the key cylinder rod, and protruding toward the inner side of the tail gate, the access to the key cylinder rod from the opening portion can be securely regulated.

In one embodiment of the present invention, the inner panel and the outer panel are made of a synthetic resin.

In this case, since the inner panel and the outer panel of the tail gate are made of the synthetic resin, it is extremely easy to carry out the forming process in comparison with the case made of the steel plate. And, a freedom of setting a shape is high and a forming can be easily carried out in comparison with the case made of the steel plate, at the time of designing the shape of the inner panel so as to dispose the key cylinder rod within the cover space portion between the inner panel and the cover body, further providing with the vertical wall protruding integrally from the inner panel at both sides in the widthwise direction of the vehicle of the latch assembly, furthermore providing with the protruding walls protruding from the outer panel in the side of the back face of the latch assembly, furthermore providing the lamp unit mounting opening portion and at the time of providing the protection wall for regulating the access to the key cylinder rod between the license lamp unit mounting opening portion and the key cylinder rod. In addition, a farther weight saving of the tail gate is achieved.

DESCRIPTION OF THE PREFERRED EMBODIMENTS

A description will be in detail given below of embodiments in accordance with the present invention with reference to the accompanying drawings.

Figure 1:
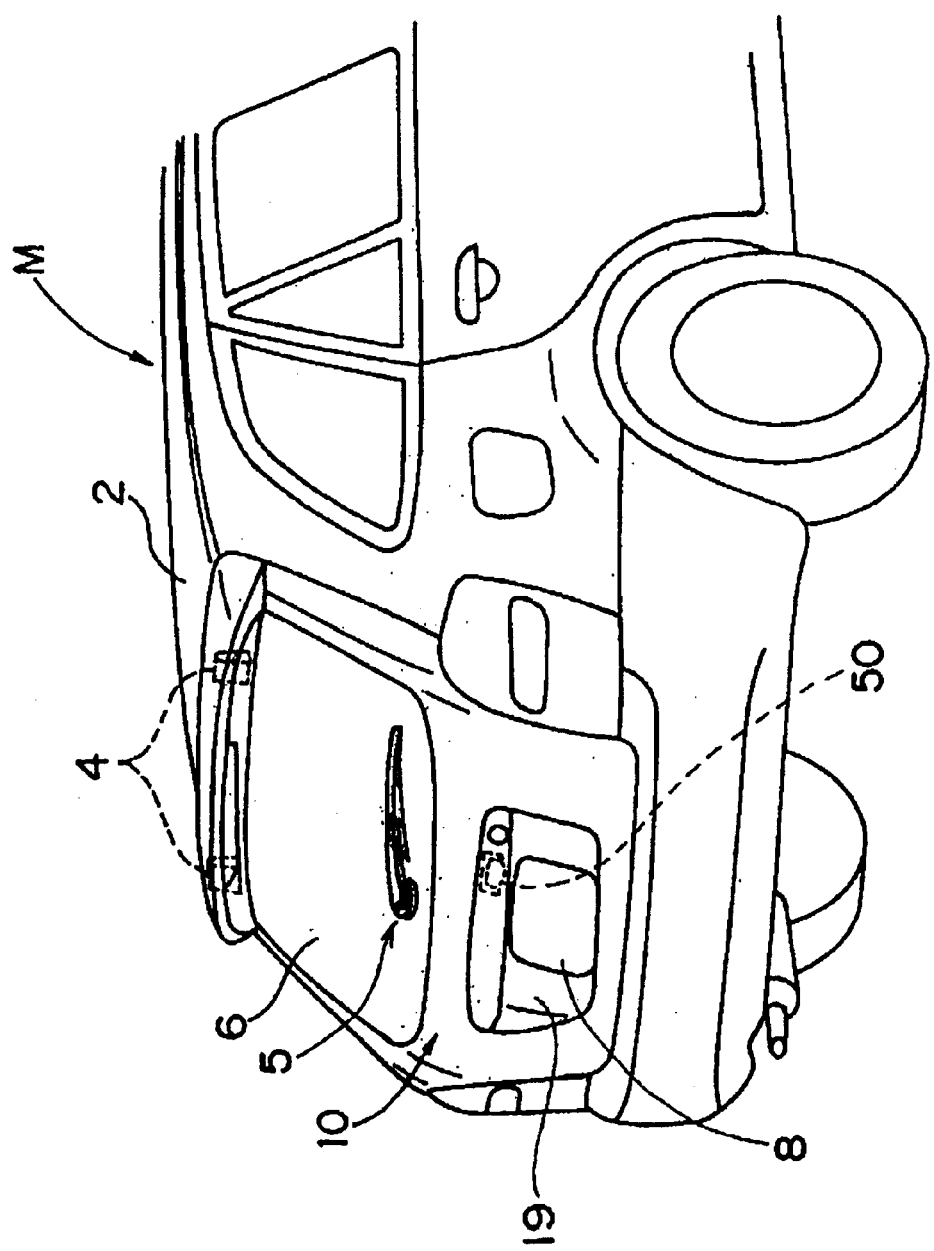
FIG. 1 is a perspective view showing a rear portion of a vehicle body in an automobile in accordance with a first embodiment of the present invention.
Figure 2:
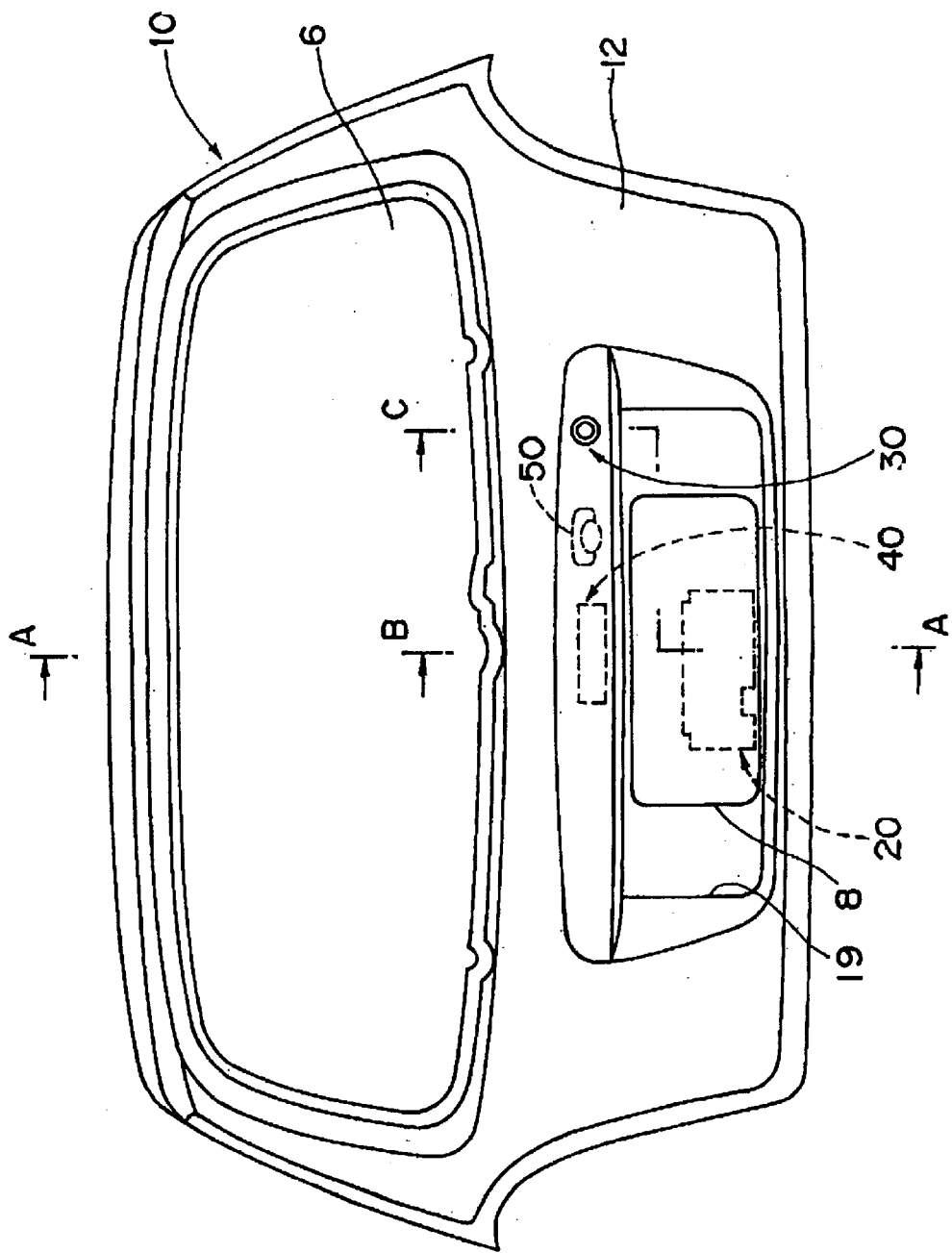
FIG. 2 is a front elevational schematic view of a tail gate mounted to the rear portion of the vehicle body in the automobile.
Figure 4:
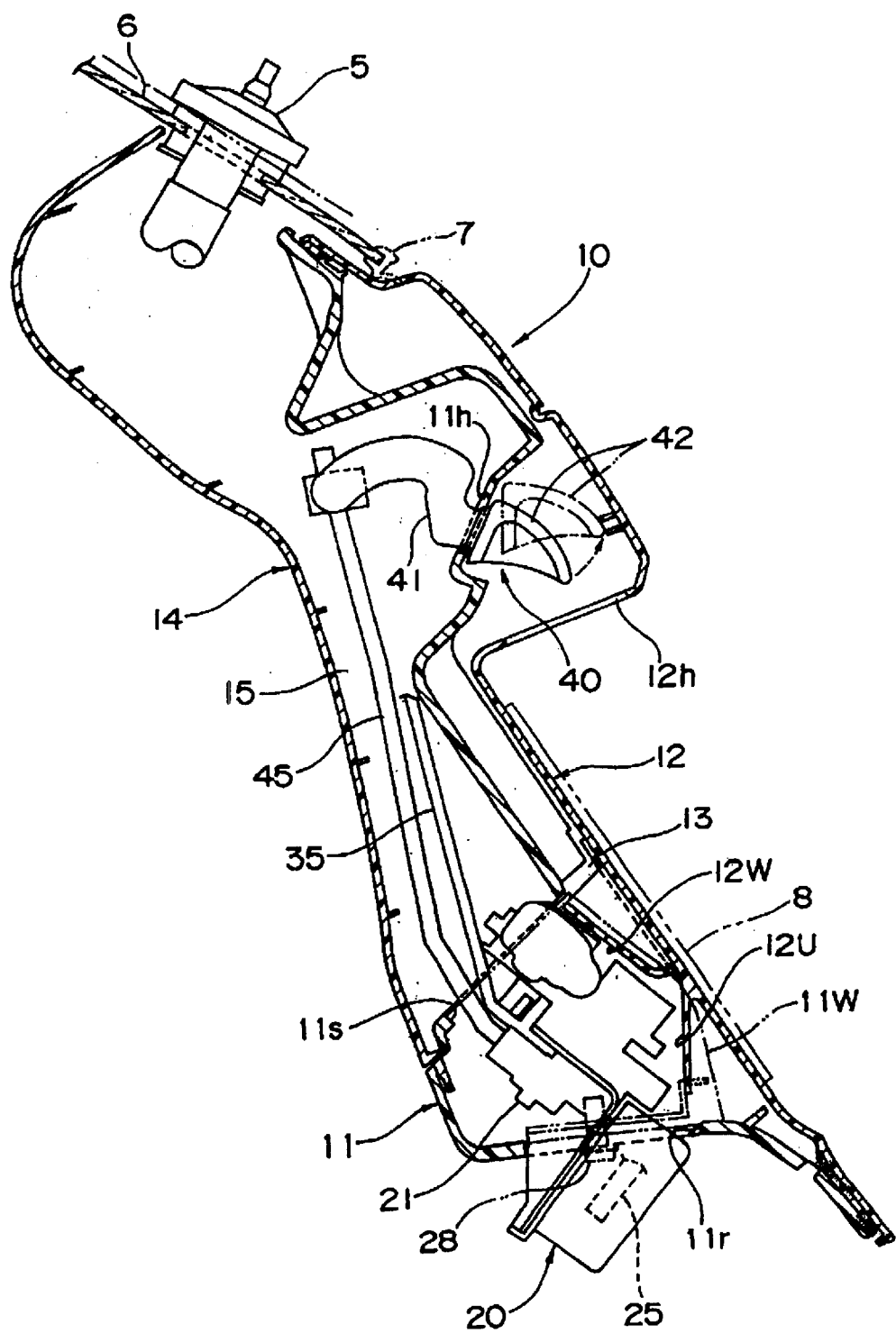
FIG. 4 is a cross sectional schematic view along a line B-A in FIG. 2.
Figure 5:
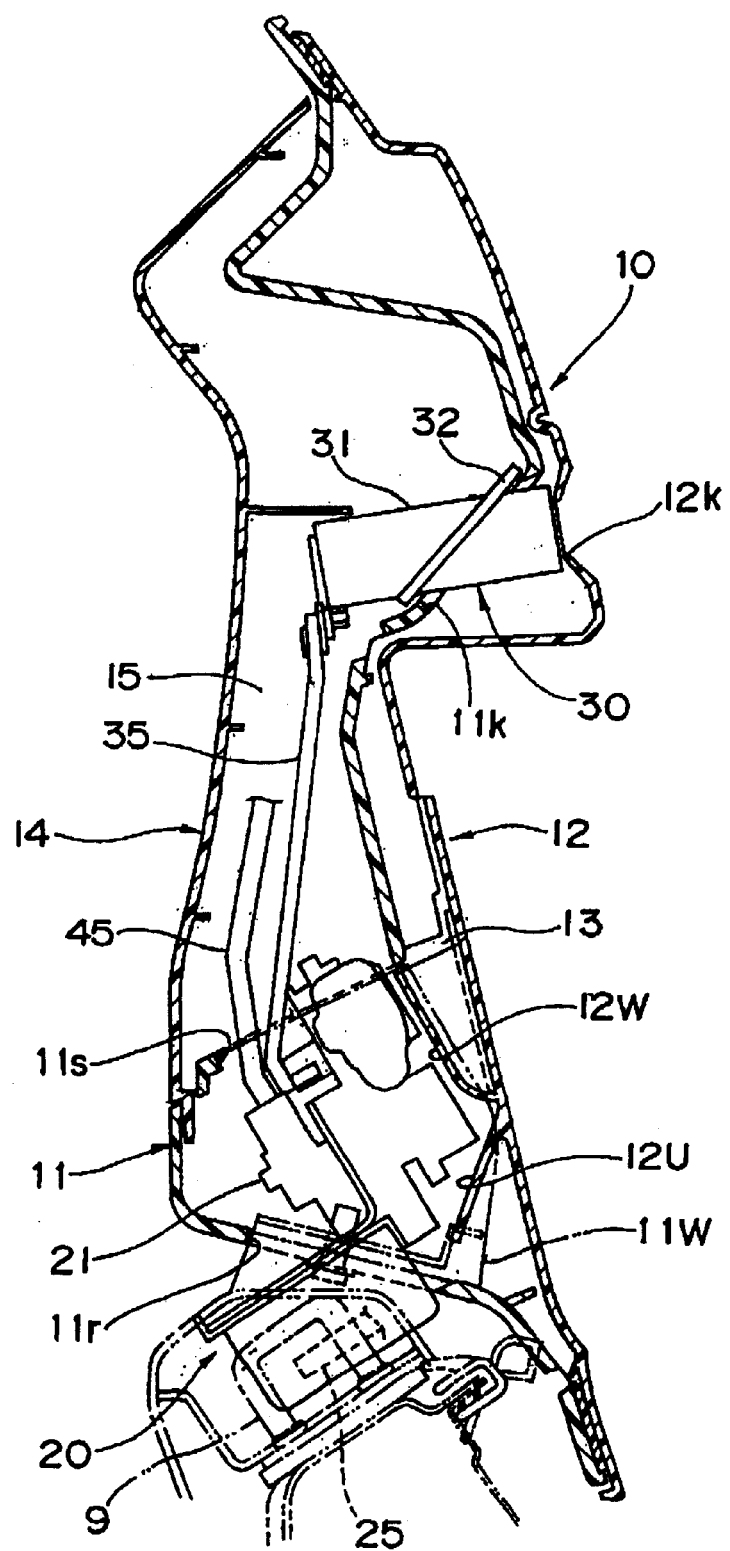
FIG. 5 is a cross sectional schematic view along a line C-A in FIG. 2.

First, a description will be given of a first embodiment. FIG. 1 is a perspective view showing a rear portion of a vehicle body in an automobile M in accordance with a first embodiment of the present invention, FIG. 2 is a front elevational schematic view of a tail gate mounted to the rear portion of the vehicle body, FIG. 3 is a cross sectional schematic view along a line A-A in FIG. 2, FIG. 4 is a cross sectional schematic view along a line B-A in FIG. 2, and FIG. 5 is a cross sectional schematic view along a line C-A in FIG. 2.

As shown in these drawings, a tail gate 10 corresponding to an opening and closing body is mounted to the rear portion of the vehicle body of the automobile M. The tail gate 10 is to cover an opening formed in the rear portion of the vehicle body so as to freely open and close the opening in a vertical direction.

Figure 3:
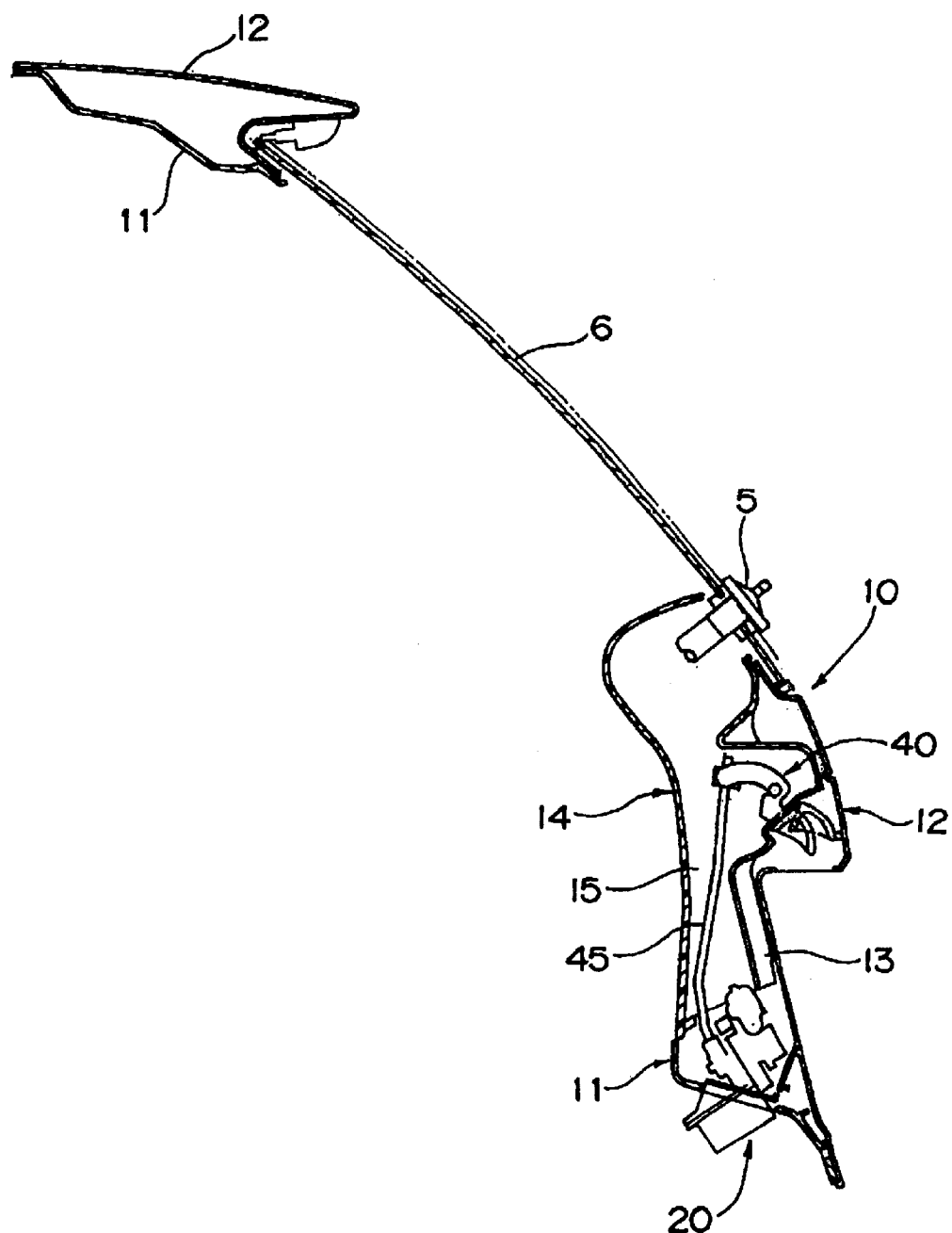
FIG. 3 is a cross sectional schematic view along a line A-A in FIG. 2.

As is well known from FIG. 3, the tail gate 10 is formed by combining an inner plate member 11 (an inner panel) and an outer plate member 12 (an outer panel) which have predetermined shapes and sizes, and then bonding peripheral edge portions and their vicinities of both of the panels 11 and 12 to each other. Thereby, the tail gate 10 is formed with a space portion 13 (a panel space portion) between both of the members 11 and 12. In this case, an upper end of a rear window glass 6 is supported to the tail gate 10 via a seal member 7. Further, a wiper apparatus 5 is mounted to an approximately center in a lower end side of the rear window glass 6.

As shown in FIG. 1, a center recess portion 19 recessed toward an inner side of the vehicle body is formed in an approximately center portion in a lower portion of the tail gate 10 (a lower portion than the rear window glass 6), and a license plate 8 (a so-called number plate) of the vehicle is mounted to the center recess portion 19. Further, a license lamp unit 50 provided with a lamp (a license lamp) for lighting up the number plate 8 in the night or the like is arranged in an upper side of the center recess portion 19.

Both of the inner and outer panels 11 and 12 are more preferably formed by using a synthetic resin material, and peripheral edge portions thereof and portions close thereto are bonded to each other, for example, using an adhesive agent.

As the synthetic resin material of the inner panel 11, for example, a polypropylene (PP) resin in which about 40% glass reinforced fiber is blended is employed. Further, as the synthetic resin material of the outer panel 12, a resin material on the basis of a polycarbonate (PC) resin and an acetyl nitrile butadiene styrene (ABS) resin is employed. Furthermore, an adhesive agent of urethane resin group is employed for the adhesive agent.

Figure 9:
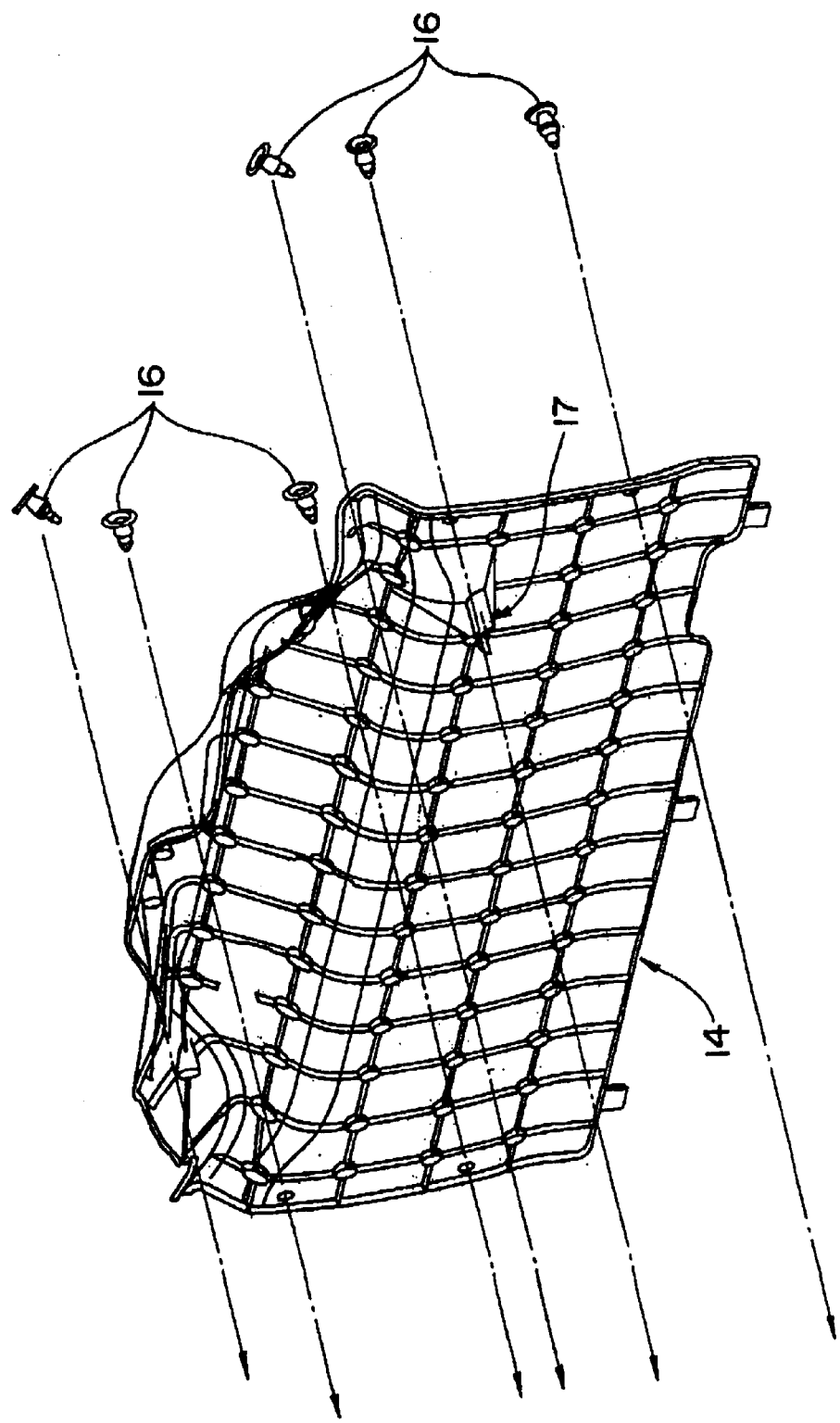
FIG. 9 is a perspective view of an inner cover mounted to the tail gate.

Further, a cover body 14 (an inner cover) for covering an inner side of the passenger room in the inner panel 11 is arranged in an inner side of the lower portion than the rear window glass 6 in the inner panel 11. The inner cover 14 is to play a part of a so-called interior trim, in a portion covered by it. The inner cover 14 is assembled to the inner panel 11 from the inner side of the passenger room, and is fixed to the inner panel 11 with a space portion 15 (a cover space portion) between both of the panels 11 and 14. The inner cover 14 is assembled to the inner panel 11 by fastening a plurality of suitable portions near the peripheral edge portion to the inner panel 11, for example, using screw members 16, as shown in FIG. 9. The inner cover 14 is made of a synthetic resin, and is formed, for example, by using the PP resin as the material.

In this case, the respective resin materials of the inner cover 14 and the inner and outer panel members 11 and 12, and the adhesive agent for bonding the inner and outer panel members 11 and 12 to each other are not limited to the materials exemplified above. And it goes without saying that the other various suitable materials can be employed.

Further, in the rear portion of the vehicle body of the automobile M, a pair of hinge units 4 (refer to FIG. 1) are fixed to an upper side of a rear header extending in a widthwise direction of the vehicle body in a rear end of the vehicle roof 2. Further, an upper end side of the tail gate 10 is mounted to a rear end portion of the vehicle roof 2 via the hinge unit 4.

The hinge unit 4 is the same as the conventionally known one, and is formed, for example, by a metal material such as a steel material and the like. Accordingly, the tail gate 10 is supported to the rear end portion of the vehicle roof 2 in a vertically rotatable manner in such a way as to cover the opening portion of the rear portion in the vehicle body so as to open and close in a vertical direction.

The tail gate 10, corresponding to a locking and unlocking mechanism of the tail gate, is provided with a latch assembly 20, a key cylinder assembly 30 and a handle (an outer handle) assembly 40 as basic constituting elements. The latch assembly 20 has a latch 25 capable of engaging with a striker 9 (refer to FIG. 5) fixed to the vehicle body. The key cylinder assembly 30 is to switch lock and unlock states of the latch assembly 20 from an external side on the basis of a key operation. And the handle (an outer handle) assembly 40 (refer to FIG. 4) is to switch engagement and disengagement states of the latch 25 with respect to the striker 9 from an outer side on the basis of a handle operation, in the unlock state of the latch assembly 20.

Further, the key cylinder assembly 30 and the handle assembly 40 are connected to the latch assembly 20 respectively via a key cylinder rod 35 and a handle rod 45.

In the present embodiment, preferably, the latch assembly 20, the key cylinder assembly 30 and the handle assembly 40 are all assembled in the inner panel 11.

In the inner panel 11, there are formed in an approximately center portion in the widthwise direction of the vehicle, a handle mounting opening portion 11h, a rod inserting opening portion 11s and a latch mounting opening portion 11r. The handle mounting opening portion 11h is for mounting the handle assembly 40. The rod inserting opening portion 11s is for basically inserting the operation rod (the key cylinder rod 35 and the handle rod 45) therethrough. And the latch mounting opening portion 11r is for mounting the latch assembly 20 (refer to FIG. 4).

Further, a key cylinder mounting opening portion 11k (refer to FIG. 5) for mounting the key cylinder assembly 30 is formed in a side portion a predetermined distance apart from the handle mounting opening portion 11h of the inner panel 11.

On the other hand, in the outer panel 12, a handle operating opening portion 12h is formed at a portion positioned obliquely below the handle mounting opening portion 11h, and a cylinder hole 12k is provided at a portion corresponding to the key cylinder mounting opening portion 11k. The handle operating opening portion 12h is for operating the handle from an external side. And the cylinder hole 12k is for exposing a key hole 31h (see FIGS. 11 and 12) on an end surface of the cylinder main body 31 to the external portion.

The handle assembly 40 is mounted to the inner panel 11 in addition that the handle main body 41 is inserted into the handle mounting opening portion 11h from the outer side. Accordingly, the handle main body 41 is positioned in an inner side from the inner panel 11 and an outer side from the inner cover 14 (that is, within the cover space portion 15). On the other hand, a handle operation portion 42 is positioned within the panel space portion 13 between the inner panel 11 and the outer panel 12, and is arranged so as to face to the handle operating opening portion 12h of the outer panel 12.

A handle rod 45 is connected to an inner end portion of the handle main body 41 in an upper end portion thereof. The handle rod 45 is to connect the handle assembly 40 to the latch assembly 20, and to switch the engagement and disengagement states of the latch 25 with respect to the striker 9 from the external side by the handle operation, in the unlock state of the latch assembly 20.

Further, the structure is made such that the handle rod 46 is moved upward and downward by rotating the handle operation portion 42 in the vertical direction, in the unlock state of the latch assembly 20, whereby the engagement and disengagement states of the latch 25 can be switched with respect to the striker 9.

Further, the key cylinder assembly 30 is mounted to the inner panel 11 via a bracket 32 in addition that a cylinder main body 31 inserts the key cylinder mounting opening portion 11k partway. Accordingly, an inner portion from the bracket 32 of the cylinder main body 31 is positioned within the cover space portion 15, an outer portion is positioned within the panel space portion 13, and an end surface portion thereof is arranged so as to face to the, cylinder hole 12k of the outer panel 12.

As shown in FIG. 9, a key cylinder supporting portion 17 for supporting the key cylinder assembly 30 (in particular, supporting a front portion of the cylinder main body 31) is provided in a rear surface of the inner cover 14.

Figure 10:
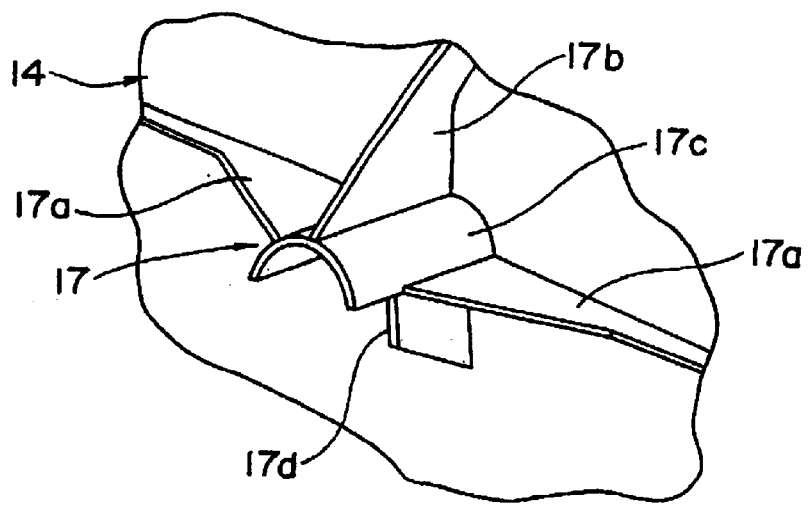
FIG. 10 is a perspective view showing a key cylinder supporting portion provided in an inner cover.
Figure 11:
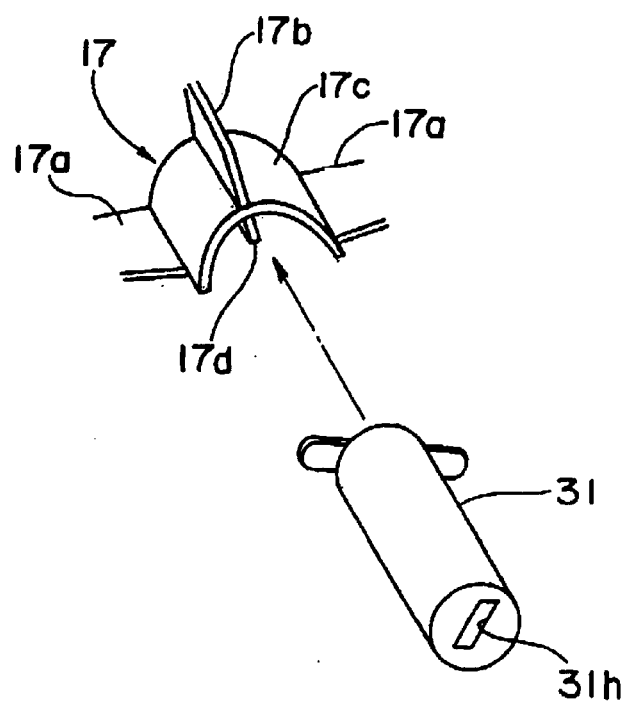
FIG. 11 is a perspective view showing the key cylinder supporting portion and a key cylinder body before an assembling step.
Figure 12:
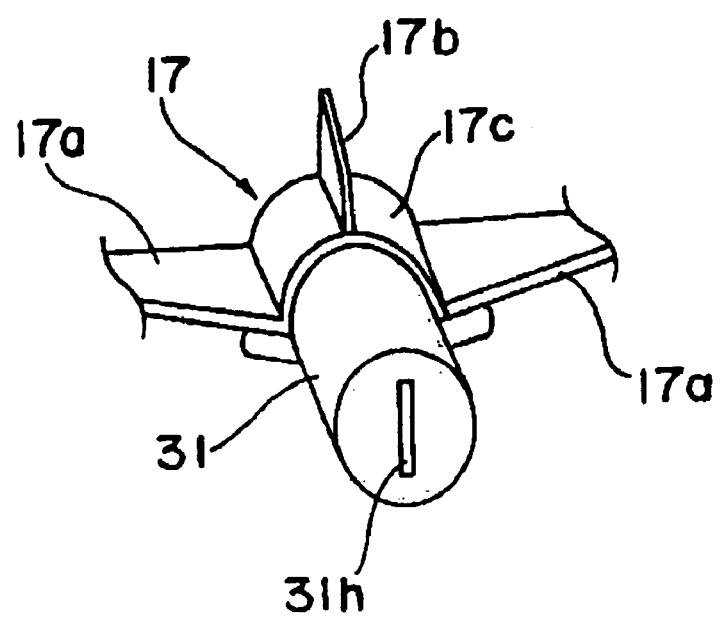
FIG. 12 is a perspective view showing the key cylinder body supported by the key cylinder supporting portion.

As shown in FIGS. 10 to 12, the key cylinder supporting portion 17 is provided with a reinforcement rib consist of a lateral reinforcement rib 17a and a vertical reinforcement rib 17b, a guide wall 17c and a stopper rib 17d. The guide wall 17c is for guiding a front portion of the cylinder main body 31, and is formed to semi-cylindrical shape. And the stopper rib 17d is to contact and stop a front end of the cylinder main body 31.

When the key cylinder assembly 30 (that is, the cylinder main body 31) is assembled to the inner panel, the cylinder main body 31 is inserted into the guide wall 17c, while the front portion thereof is guided by the guide wall 17c, until its front end contacts to the stopper rib 17d and stopped thereby. Thereby, the front portion of the cylinder main body 31 is supported by the key cylinder supporting portion 17.

Accordingly, the cylinder main body 31 of the key cylinder assembly 30 is fixed to the inner panel 11 via the bracket 32 in a middle portion thereof, and is supported in a front portion by the key cylinder supporting portion 17 provided in the inner cover 14.

As described above, the cylinder main body 31 is supported by the key cylinder supporting portion 17 provided in the inner cover 14. Thereby, the cylinder main body 31 does not drop out easily even in the case that the impact is applied to the cylinder main body 31, also thereby making it harder to carry out an illegal locking and unlocking operation.

It is to be noted that the key cylinder supporting portion 17 as mentioned above may be provided in the inner panel 11.

The key cylinder rod 35 is connected to the inner end portion of the cylinder main body 31 at an upper end portion thereof. The key cylinder rod 35 is to connect the key cylinder assembly 30 to the latch assembly 20 and to switch the locking and unlocking states of the latch assembly 20 from the external side on the basis of the key operation.

And, the key cylinder rod 35 is moved upward and downward by inserting a predetermined key (not shown) into a key hole 31h (as shown in FIGS. 11 and 12) on the outer end surface of the cylinder main body 31 so as to rotate the key. Thereby it is possible to switch the locking and unlocking states of the latch assembly 20.

Figure 6:
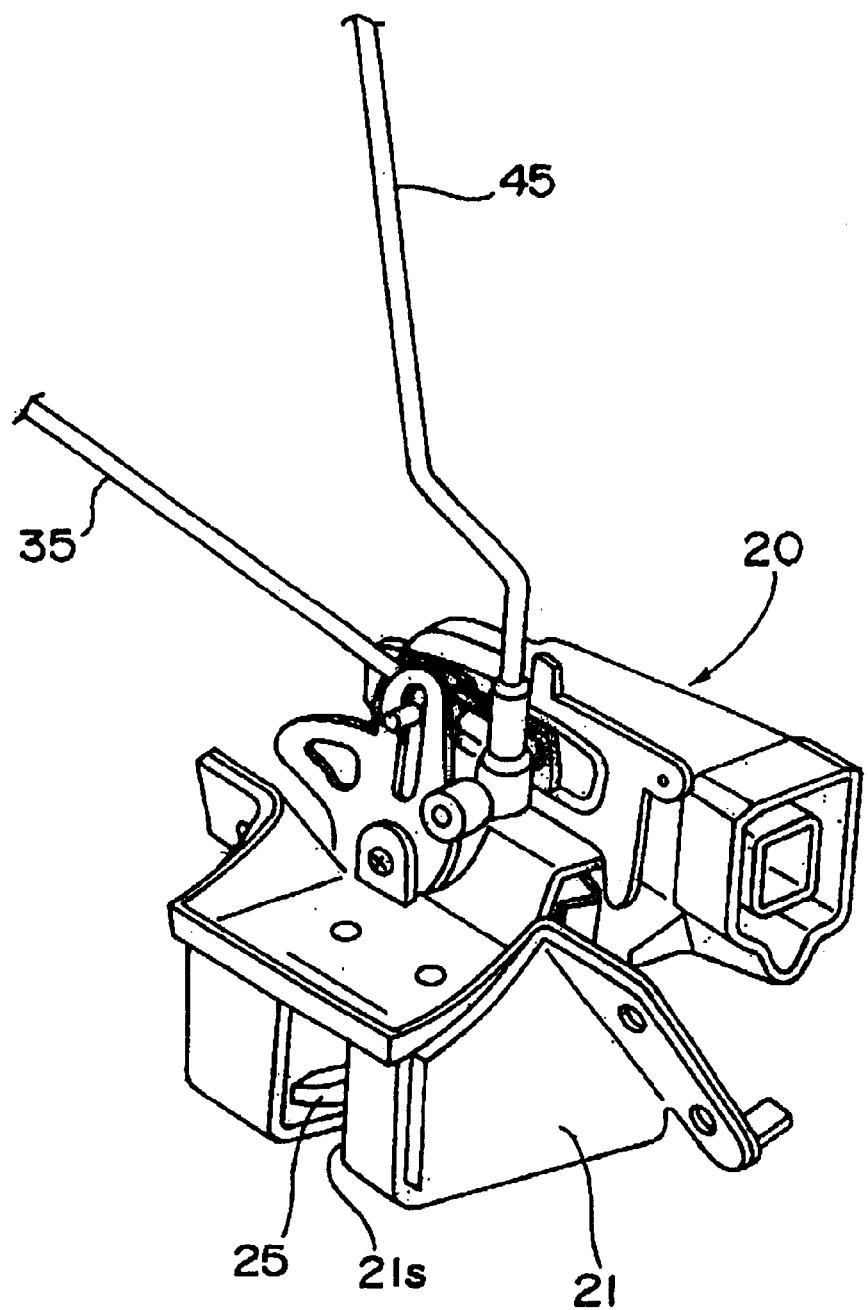
FIG. 6 is a perspective view of a latch assembly mounted to the tail gate.

Further, the latch assembly 20 is fixed to the inner panel 11 with using bolts 28 after the lower portion of the assembly main body 21 is fitted to the latch mounting opening portion 11r. And the upper portion of the assembly main body 21 protrudes upward from the rod inserting opening portion 11s at a little amount. Accordingly, a major part of the assembly main body 21 is positioned within the panel space portion 13. In this case, the latch 25 is arranged, as shown in FIG. 6, within an inner groove 21s of the assembly main body 21, and is positioned in an inner lower side from the inner panel 11. The latch 25 is able to freely move forward and backward along the inner groove portion 21s.

The key cylinder rod 35 for connecting the key cylinder assembly 30 to the latch assembly 20 is connected, as mentioned above, to the inner end portion of the cylinder main body 31 at an upper end portion thereof. The key cylinder rod 35 extends toward a lower side in the cover space portion 15 from this connection portion, and is connected to the latch assembly 20 at a lower end portion thereof in addition that a portion close to a lower end is inserted to the rod inserting opening portion 11s.

That is, the key cylinder rod 35 is substantially extended between the key cylinder assembly 30 and the latch assembly 20 within the cover space portion 15 between the inner panel 11 and the inner cover 14.

Accordingly, the key cylinder rod 35 is covered by two panel members (the inner and outer panel members 11 and 12) in an outer side thereof. As a result, even in the case of bursting through the outer panel 12 from the external portion, for example, by a pointed hard rod-like body or the like in a state in which the tail gate 10 is closed and the latch assembly 20 is locked, the key cylinder rod 35 can not be unlocked until further bursting through the inner panel 11 so as to pierce a hole.

That is, in comparison with the conventional structure in which the outer side of the key cylinder rod is covered by only one outer panel, it is hard to illegally unlock and it is possible to effectively prevent a theft damage.

In this case, it is possible to make it harder to carry out an illegal locking and unlocking operation with respect to a tail gate, without increasing number of parts, by employing a relatively simple constitution in which the key cylinder rod 35 is disposed at inner side than the inner panel 11.

In this case, more preferably, with respect to the handle rod 45 connecting the handle assembly 40 to the latch assembly 20, an upper end portion thereof is connected to an inner end portion of the handle main body 41 as mentioned above. And, the handle rod 45 extends toward a lower side from the connection portion in the cover space portion 15, a portion close to a lower end thereof is inserted into the rod inserting opening portion 11s, and the lower end portion is connected to the latch assembly 20. That is, the handle rod 45 is also substantially extended between the handle assembly 40 and the latch assembly 20 within the cover space portion 15.

Further, in order to more effectively prevent the illegal operation against the latch assembly 20, at least both sides in the widthwise direction of the vehicle of the latch assembly 20 are covered by the vertical wall.

Figure 7:
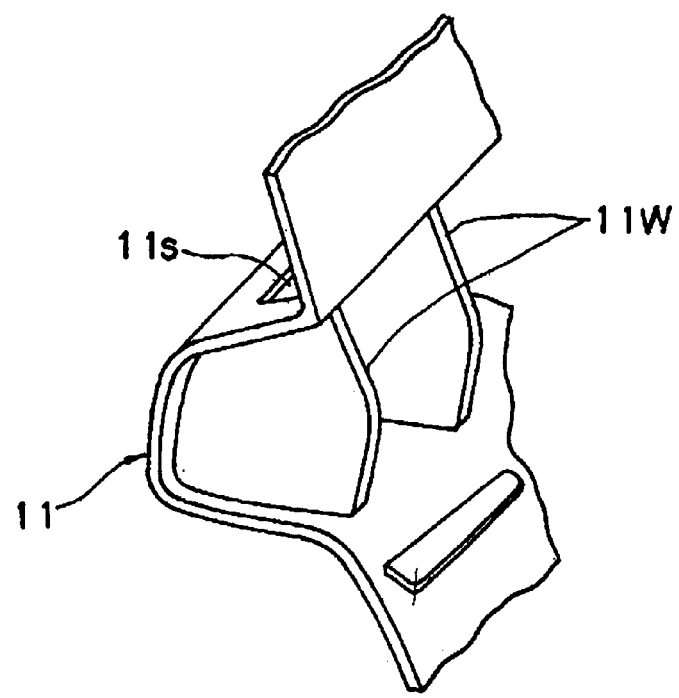
FIG. 7 is a perspective view of a vertical wall portion protruding from an inner panel of the tail gate.

That is, a pair of vertical wall portions 11W protruding rearward are preferably formed integrally in both sides in the widthwise direction of the vehicle of the portion corresponding to the position at which the latch assembly 20 is arranged in the inner panel 11, as shown in FIG. 7.

Further, in the assembled state of the latch assembly 20 with the inner panel 11, as shown by two-dot chain line curves in FIGS. 4 and 5, these vertical wall portions 11W cover both sides of the latch assembly 20 in the direction of the vehicle width. Accordingly, it is possible to effectively prevent the illegal operation against the latch assembly 20 from the side portion in the widthwise direction of the vehicle.

In this case, the vertical wall as mentioned above may be provided so as to protrude not only from the inner panel 11 but also from the side of the outer panel 12.

Further, more preferably, in a state in which the latch assembly 20 is assembled in the inner panel 11, a rear surface of an area positioned within the panel space portion 13 in the assembly main body 21 of the latch assembly 20 is covered by upper and lower protruding walls 12W and 12U provided so as to protrude from the outer panel 12, as shown in FIGS. 4 and 5.

Figure 8:
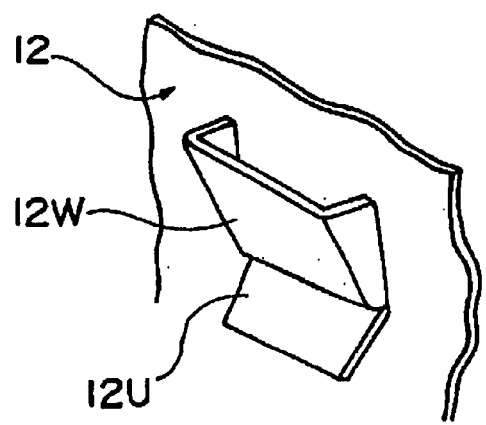
FIG. 8 is a perspective view of a protruding wall portion protruding from an outer panel of the tail gate.

These protruding walls 12W and 12U protrude so as to be inclined with a predetermined angle with respect to a back surface of the outer panel 12, in a side of the back surface of the outer panel 12, as shown in FIG. 8. That is, the upper and lower protruding walls 12W and 12U extending with respect to the outer panel 12 are positioned in a rear side of the latch assembly 20 in a longitudinal direction of the vehicle body. Those upper and lower protruding walls 12W and 12U are corresponding to "cover wall portions".

Accordingly, in the portion corresponding to the upper and lower protruding wall portions 12W and 12U, the outer side of the latch assembly 20 is doubly covered by the outer panel 12 and the protruding wall portion 12W or 12U. As a result, it is hard to carry out the illegal lock cancellation from the rear side of the vehicle body, in comparison with the conventional structure in which the outer side is covered only by the outer panel, and it is possible to effectively prevent the theft damage.

In this case, it is possible to make it harder to carry out an illegal locking and unlocking operation with respect to a tail gate, without increasing number of parts, by employing a relatively simple constitution in which protruding walls 12W, 12U are provided on the back surface of the outer panel 12.

In the present embodiment, since the inner panel 11 and the outer panel 12 are made of the synthetic resin, it is extremely easy to carry out a forming process in comparison with the case made of a steel plate. Accordingly, a freedom of setting a shape is high and a forming can be easily carried out in comparison with the case made of the steel plate, in designing the shape of the inner panel so as to dispose the key cylinder rod 35 within the cover space portion 15 between the inner panel 11 and the inner cover 14, further, in providing with the vertical wall 11W protruding integrally from the inner panel 11 at both sides in the widthwise direction of the vehicle of the latch assembly 20, furthermore, in providing with the protruding walls 12U, 12W protruding from the outer panel 12 in the side of the back face of the latch assembly 20. In addition, a further weight saving of the tail gate is achieved.

Further, in the embodiments mentioned above, at least the main portion of the "lock apparatus" is constructed by the latch assembly 20, the key cylinder assembly 30 and the key cylinder rod 35, however, the present invention is not limited to the tail gate 10 in which such a mechanical type locking mechanism is provided, and the present invention can be effectively applied to a structure provided with a so-called keyless entry system, passive keyless entry system or the like, which directly drives a latch driving actuator of the latch assembly in accordance with a remote control utilizing a wireless communication means or the like so as to switch the lock and unlock states of the latch assembly.

Even when such a system is equipped to the tail gate, basically, by disposing a lock apparatus (a latch assembly) having a latch capable of engaging with striker fixed to the vehicle body between a inner panel and a cover body (a inner cover), it is possible to make harder to carry out an illegal locking and unlocking operation with respect to a tail gate, and it is possible to effectively prevent the theft damage.

Figure 13:
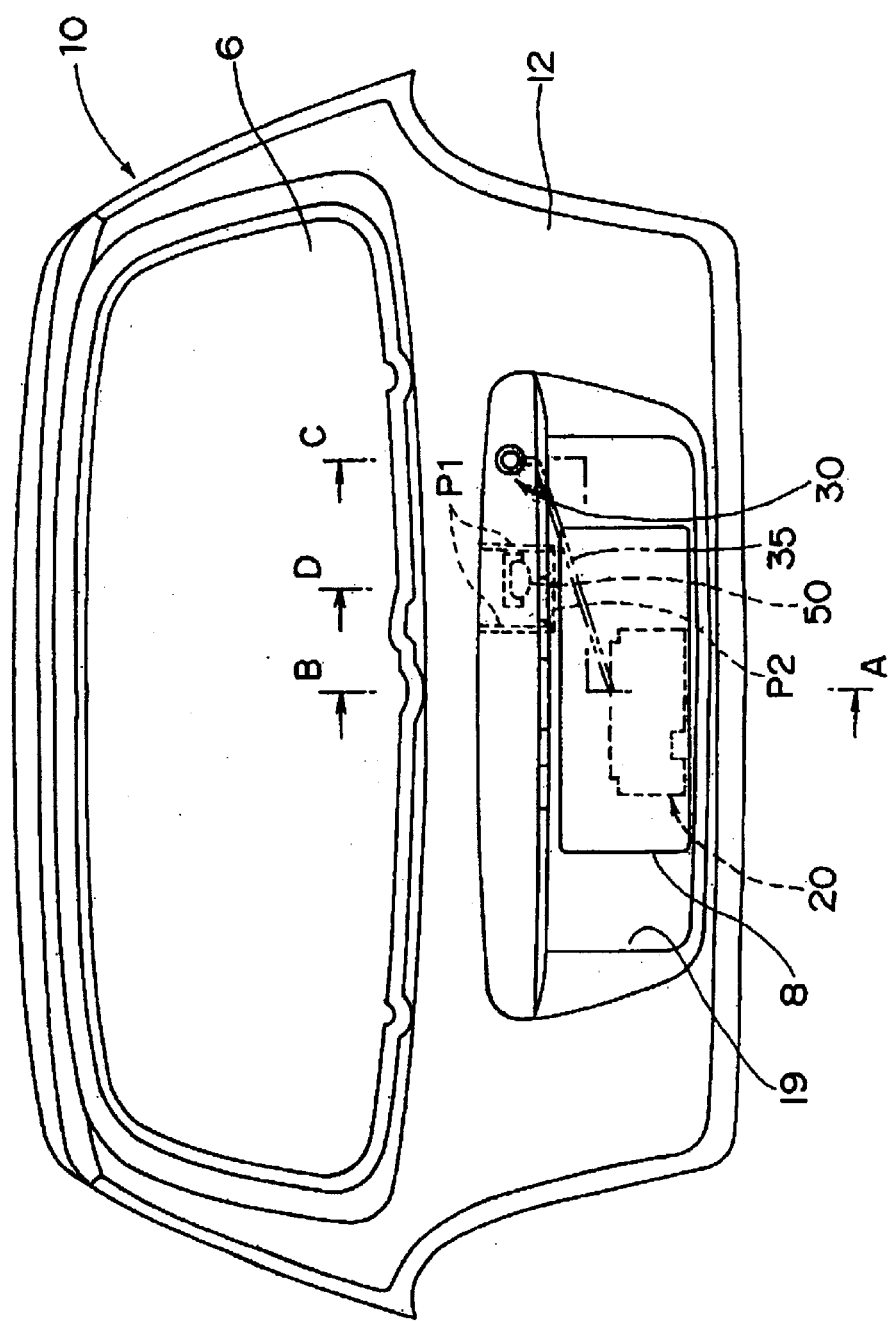
FIG. 13 is a front elevational schematic view of a tail gate mounted to a rear portion of a vehicle body in an automobile in accordance with a second embodiment of the present invention.
Figure 14:
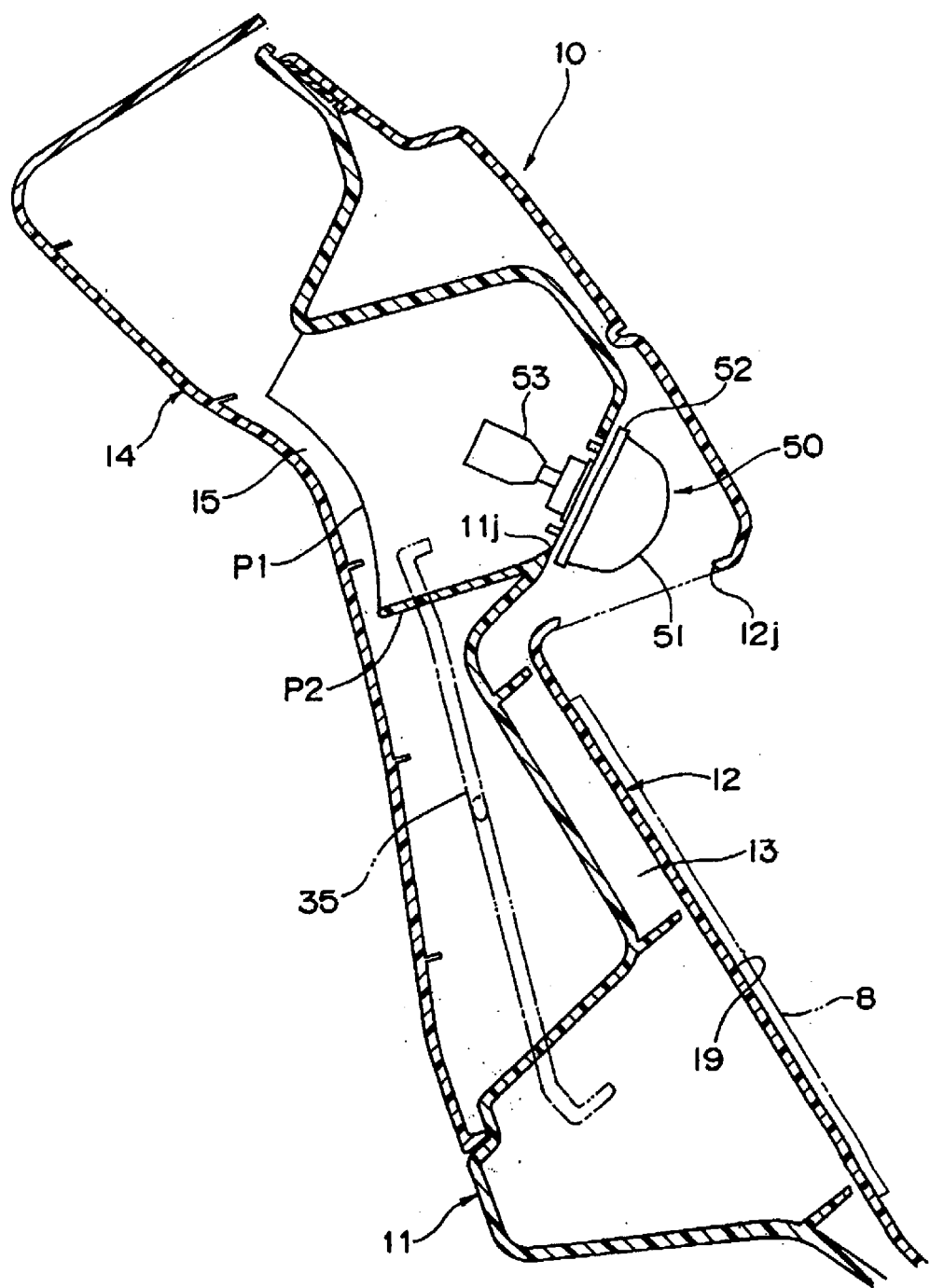
FIG. 14 is a cross sectional schematic view along a line D-A in FIG. 13.

As mentioned above, the license lamp unit 50 (refer to FIGS. 1 and 13) provided with the license lamp is arranged in the upper side of the center recess portion 19. The license lamp is for lighting up the license plate 8 (the so-called number plate) of the vehicle mounted to the center recess portion 19 in the lower portion of the tail gate.

A description will be given below of a mounting structure of the license lamp unit 50 to the tail gate 10.

A lamp mounting opening portion 11j for mounting the license lamp unit 50 is formed at a predetermined position between the handle mounting opening portion 11h and the key cylinder mounting opening portion 11k in the inner panel 11 of the tail gate 10, as in detail shown in FIG. 3. On the other hand, a lighting opening portion 12j for passing an irradiation light of the license lamp 51 through a side of the number plate 8 is formed at a position positioned obliquely below the lamp mounting opening portion 11j, in the outer panel 12.

The license lamp unit 50 is constructed by fixing the license lamp 51 corresponding to a light source onto a base plate 52. And the base plate 52 (that is, the license lamp unit 50) is detachably mounted to the opening portion 11j of the inner panel 11, for example, by using a screw member (not shown). Accordingly, at the time of maintenance such as replacement of the lamp 51 or the like, it is possible to easily take out the lamp unit 50 from the mounting opening portion 11j by disengaging the screw member. In this case, a connector portion 53 is attached to a side of a back surface of the base plate 52.

In the present embodiment, in order to make it possible to prevent the key cylinder rod from being operated from external side of the vehicle through the opening portion 11j so as to avoid the theft damage, even when the license lamp unit 50 is taken out from the mounting opening portion 11j of the tail gate 10, a protection wall for regulating an access to the key cylinder rod 35 is provided between the lamp unit mounting opening portion 11j and the key cylinder rod 35.

Figure 15:
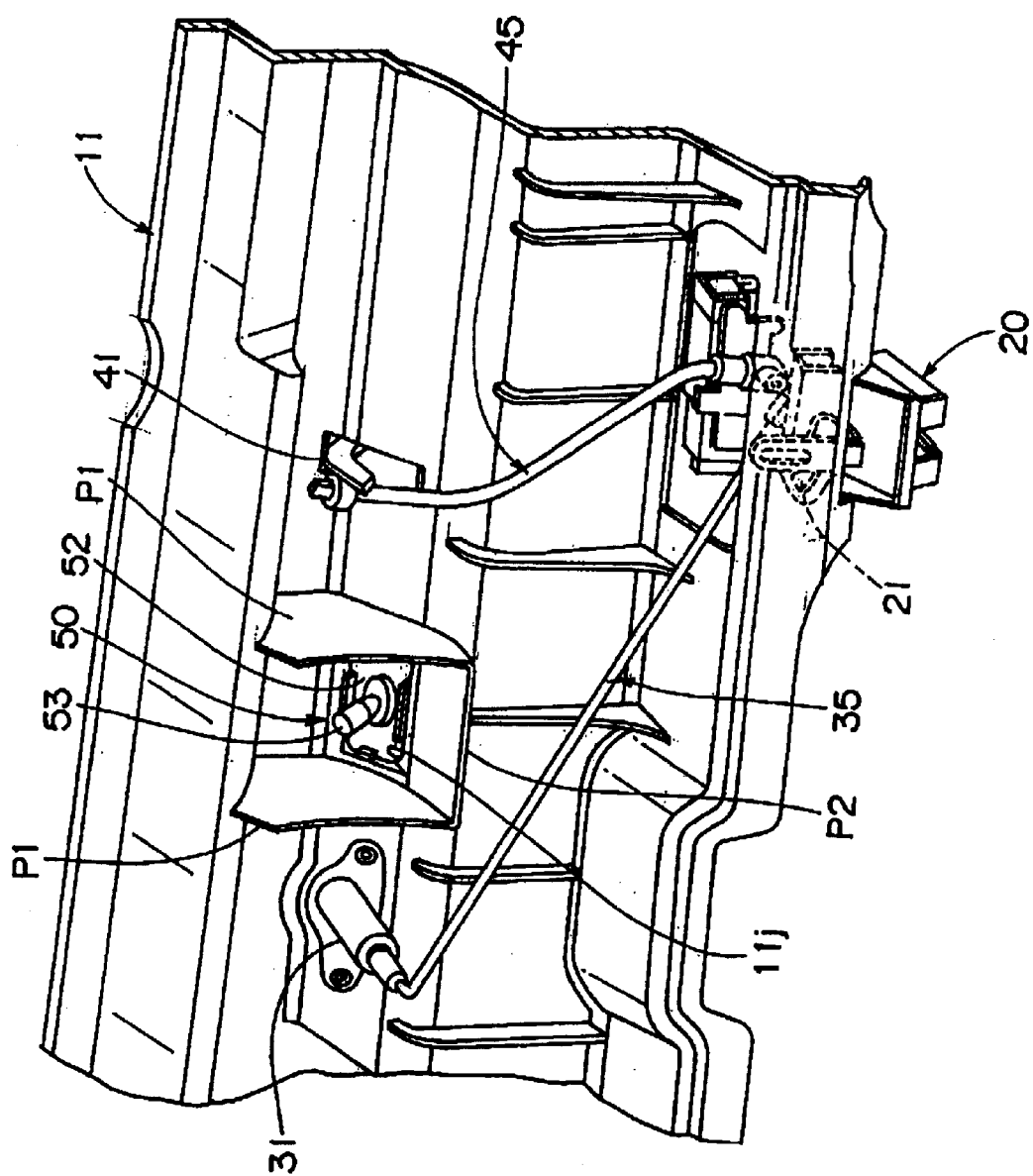
FIG. 15 is a perspective view showing the inner panel of the tail gate as seen from a side of a passenger room in a state in which the inner cover is detached.

FIG. 15 is a perspective view showing the inner panel 11 of the tail gate 10 in a state in which the inner cover 14 is taken out, as seen from a side of the passenger room. As shown in this drawing, the key cylinder rod 35 connects between the key cylinder main body 31 and the latch assembly 20 so as to extend in an oblique direction, in the inner side at least from the outer panel 12 (in particular, the inner side from the inner panel 11) of the tail gate 10. And the lamp unit mounting opening portion 11j is positioned in an upper side of the key cylinder rod 35.

A pair of left and right rib-shaped first standing walls P1 protruding toward an inner side of the tail gate from an inner surface of the inner panel 11 are integrally formed with the inner panel 11, in both left and right sides of the lamp unit mounting opening portion 11j. Further, a rib-shaped second standing wall P2 protruding toward the inner side of the tail gate from the inner surface of the inner panel 11 is provided integrally with the inner panel 11, at least in a side corresponding to the key cylinder rod 35 of both of upper and lower sides of the opening portion 11j (that is, a side of lower ends of both of the first standing walls P1).

In this case, the second standing wall P2 is preferably formed so as to connect the lower end portions of both of the first standing walls P1 to each other, whereby a rigidity of each of the standing walls P1 and P2 is secured. Further, both of a pair of left and right first standing walls P1 and the second standing wall P2 are more preferably integrally formed so as to protrude in a rib shape from the inner side of the inner panel 11. Accordingly, the standing walls P1 and P2 can be easily formed by molding the inner panel 11.

Accordingly, even when taking out the license lamp unit 50 from the mounting opening portion 11j, the inner side of the tail gate of the opening portion 11j is surrounded by the respective standing walls P1 and P2 in both of the left and right sides and the sides corresponding to the key cylinder rod 35, and it is very hard to access to the key cylinder rod 35 through the lamp unit mounting opening portion 11j from the outer portion of the tail gate 10 so as to illegally operate the key cylinder rod 35.

In accordance with the present embodiment, since the protection walls P1 and P2 for regulating the access to the key cylinder rod 35 are provided between the license lamp unit mounting opening portion 11j and the key cylinder rod 35, as described above, it is regulated by the protection walls P1 and P2 to access to the key cylinder rod 35 from the opening portion 11j so as to operate, even when the license lamp unit 50 is taken out from the mounting opening portion 11j, it is very hard to illegally unlock the key cylinder rod 35 from the lamp unit mounting opening portion 11j, and it is possible to effectively increase a theft prevention effect.

In particular, since the protection walls P1 and P2 are provided with a pair of left and right first standing walls P1 protruding toward the inner side of the tail gate from both of the left and right sides of the lamp unit mounting opening portion 11j, and the second standing wall P2 connecting both of the first standing walls P1 to each other in the side corresponding to the key cylinder rod 35, it is possible to effectively regulate the access to the key cylinder rod 35 from the opening portion 11j by these standing walls P1 and P2.

Further, in this case, the protection walls for regulating the access to the key cylinder rod 35 can be provided between the lamp unit mounting opening portion 11j and the key cylinder rod 35, on the basis of the simple structure in which the rib-shaped standing walls P1 and P2 are integrally molded in the inner panel 11.

Next, a description will be given of a modified embodiment of the second embodiment having a different structure of the protection walls.

Figure 16:
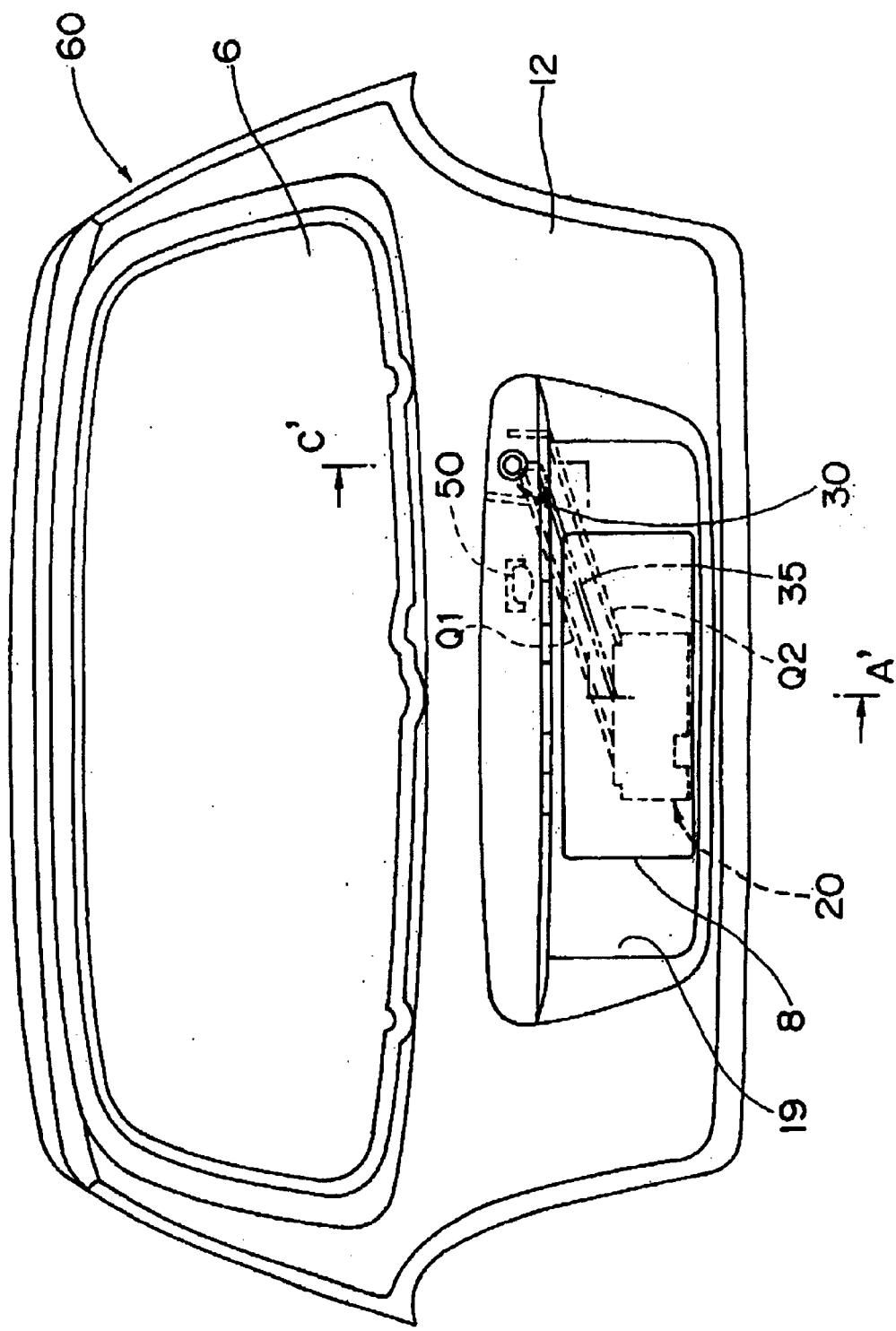
FIG. 16 is a front elevational schematic view of a tail gate in accordance with a modified embodiment of the second embodiment of the present invention.
Figure 17:
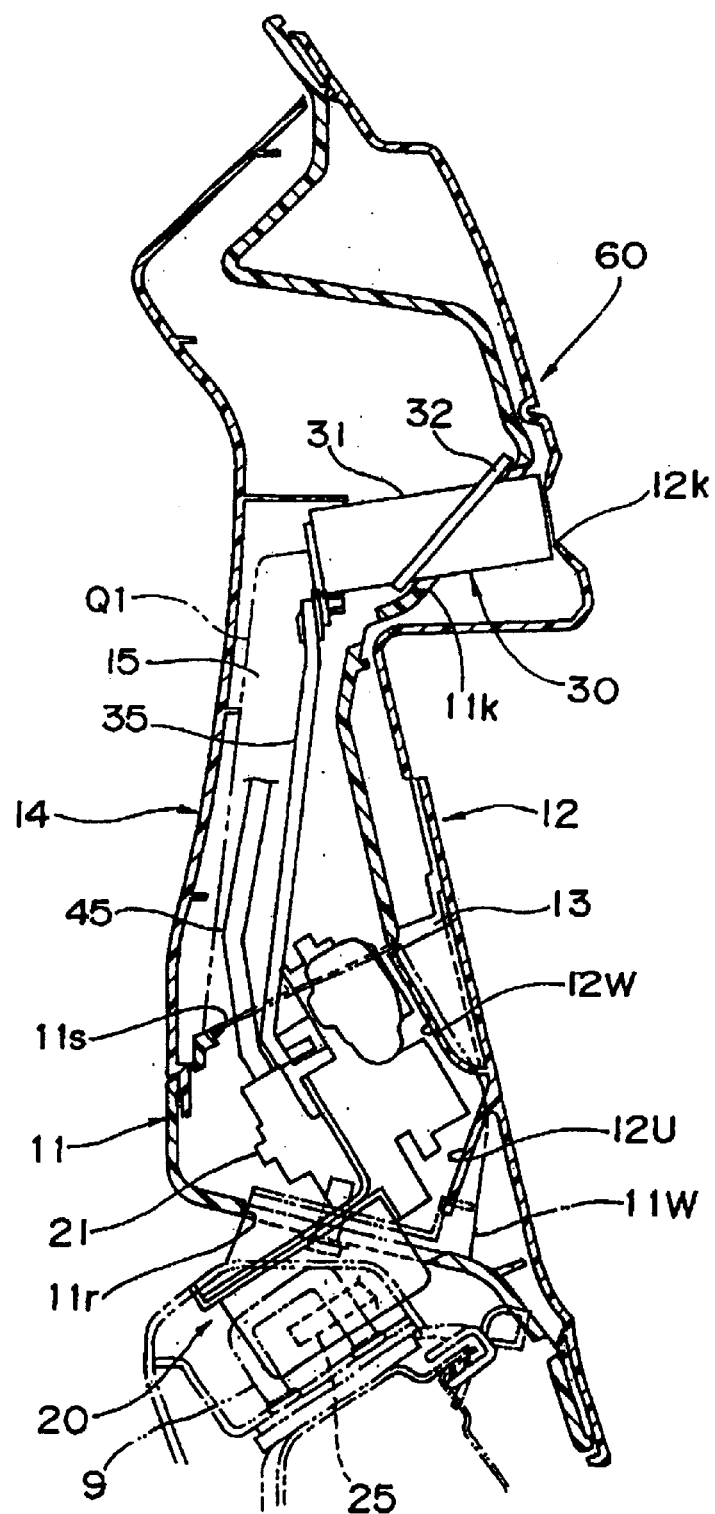
FIG. 17 is a cross sectional schematic view along a line C'-A' in FIG. 16.
Figure 18:
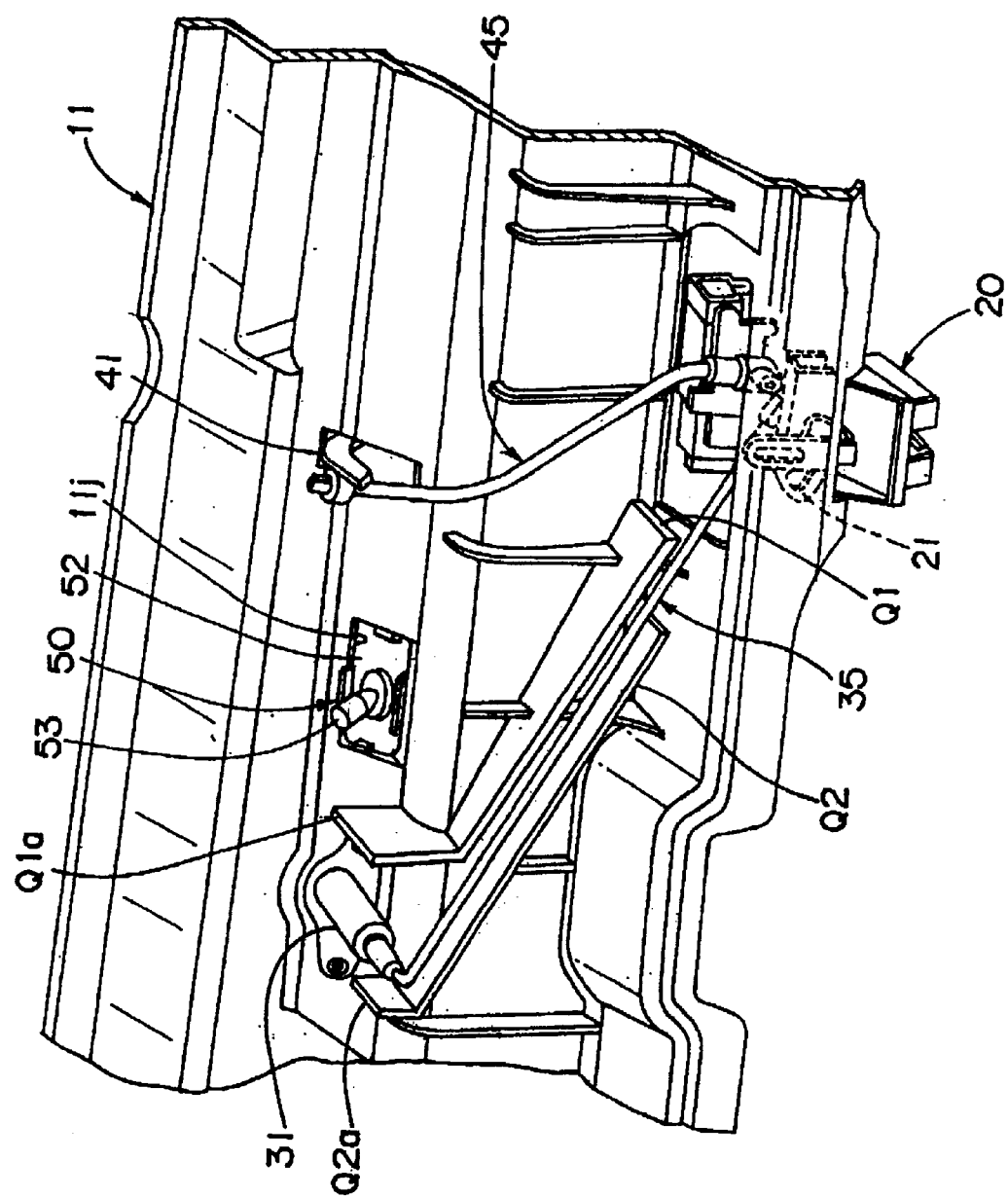
FIG. 18 is a perspective view showing an inner panel of the tail gate in accordance with the modified embodiment as seen from a side of the passenger room in a state in which an inner cover is detached.

FIG. 16 is a front elevational schematic view of a tail gate in accordance with a modified embodiment, FIG. 17 is a cross sectional schematic view along a line C'-A' in FIG. 16, and FIG. 18 is a perspective view showing an inner panel of the tail gate as seen from a side of the passenger room in a state in which an inner cover is detached.

As shown in these drawings, a tail gate 60 in accordance with the modified embodiment is provided with the same basic structure as that of the tail gate 10 in the second embodiment, however, a structure of the protection wall for regulating the access to the key cylinder rod 35 is different.

As is well known from FIG. 18, the key cylinder rod 35 connects the key cylinder main body 31 and the latch assembly 20 so as to extend in an oblique direction, in the inner side at least from the outer panel 12 (in particular, the inner side from the inner panel 11) of the tail gate 10. And the lamp unit mounting opening portion 11*j* is positioned in an upper side of the key cylinder rod 35.

A standing wall Q1 (an upper standing wall) is provided integrally with the inner panel 11, in the inner side of the inner panel 11. The upper standing wall Q1 substantially extends along the key cylinder rod 35 at least in an upper side of the key cylinder rod 35 (that is, a side corresponding to the lamp unit mounting opening portion 11*j*) and protruding toward an inner side of the tail gate. In this case, a vertical wall Q1*a* extending in a vertical direction while covering a side surface of the key cylinder main body 31 is provided in an upper end side of the upper standing wall Q1.

Accordingly, since the upper standing wall Q1 protruding to the inner side of the tail gate and substantially extending along the key cylinder rod 35 is positioned between the opening portion 11*j* and the key cylinder rod 35, even when taking out the license lamp unit 50 from the mounting opening portion 11*j*, it is very hard to access to the key cylinder rod 35 through the lamp unit mounting opening portion 11*j* from the outer portion of the tail gate 60 so as to illegally operate the key cylinder rod 35. Further, since the vertical wall Q1*a* extending in the vertical direction while covering the side surface of the key cylinder main body 31 is connected to the upper standing wall Q1, it is possible to more securely regulate the illegal operation of the key cylinder rod 35 through the lamp unit mounting opening portion 11*j*.

Here, in the case that the lamp unit mounting opening portion is not provided in the tail gate 60 or in the case that the lamp unit mounting opening portion is provided and the opening portion is not open, it is possible that the provision of the upper standing wall Q1 prevents the key cylinder rod 35 from being illegally operated by bursting through the upper portion than the key cylinder rod 35 of the panel members 12 and 11 in the tail gate 60, for example, by means of the pointed hard rod-shaped body or the like so as to pierce the hole, so that it is not possible to easily carry out the unlocking operation.

That is, it is effective in view of preventing theft even in the case that the lamp unit mounting opening portion 11*j* is not provided in the tail gate 60 to provide the upper standing wall Q1 extending substantially along the key cylinder rod 35 in the upper side of the key cylinder rod 35 and protruding toward the inner side of the tail gate.

Further, in the present modified embodiment, the standing wall Q2 (the lower standing wall) substantially extending along the key cylinder rod 35 and protruding toward the inner side of the tail gate is provided integrally with the inner panel 11 not only in the upper side of the key cylinder rod 35 (the side corresponding to the lamp unit mounting opening portion 11*j*) but also in the lower side thereof. Further, a vertical wall Q2*a* extending in a vertical direction while covering the side surface of the key cylinder main body 31 is provided in an upper end side of the lower standing wall Q2.

As described above, since the lower standing wall Q2 covering the inner side of the tail gate of the cylinder rod 53 is also provided in the lower side of the key cylinder rod 35, it is possible that the provision of the lower standing wall Q2 prevents the key cylinder 35 from being illegally operated by bursting the lower portion than the key cylinder rod 35 of the panel members 12 and 11 in the tail gate 60, for example, by a pointed hard rod-shaped body or the like. Accordingly, it is not possible to easily carry out the unlocking operation, and it is possible to effectively inhibit the theft damage from being generated.

All of the upper and lower standing walls Q1 and Q2 and the respective vertical walls Q1*a* and Q2*a* are, more preferably, integrally formed so as to protrude in a rib shape from the inner side of the inner panel 11. Accordingly, the standing walls Q1, Q2, Q1*a* and Q2*a* can be easily provided by molding the inner panel 11.

That is, in this case, the protection walls for regulating the access to the key cylinder rod 35 can be provided between the lamp unit mounting opening portion 11*j* and the key cylinder rod 35, on the basis of the simple structure in which the standing walls Q1, Q2, Q1*a* and Q2*a* are integrally formed in the inner panel 11. In this case, the respective vertical walls Q1*a* and Q2*a* are not always connected to the upper ends of the respective standing walls Q1 and Q2, and may be arranged near the respective upper end portions so as to shield the side portion of the key cylinder main body 31.

In the above-mentioned case, since the inner panel 11 and the outer panel 12 are made of the synthetic resin, it is extremely easy to carry out a forming process in comparison with the case made of a steel plate. Accordingly, a freedom of setting a shape is high and a forming can be easily carried out in comparison with the case made of the steel plate, at the time of providing with the lamp unit mounting opening portion 11*j* in the inner panel 11 and at the time of providing the standing walls P1, P2 or Q1, Q1*a,* Q2 and Q2*a* in the inner side of the inner panel 11. Further, a further weight saving of the tail gate is achieved.

In the above-mentioned cases, all of the respective standing walls P1 and P2 or Q1 and Q2 corresponding to the protection wall for regulating the access to the key cylinder rod 35 disposed between the lamp unit mounting opening portion 11*j* and the key cylinder rod 35 are formed so as to integrally protrude from the inner panel 11 of the tail gates 10 and 60, however, the standing walls may be formed so as to integrally protrude from the inner cover 14 arranged in the inner side from the inner panel 11.

Further, in the above-mentioned cases, the license lamp unit 50 is mounted to the mounting opening portion 11*j* formed in the inner panel 11 of the tail gates 10 and 60, however, in place thereof, the structure may be made such that the mounting opening portion is provided in the outer panel and the license lamp unit is mounted to the side of the outer panel.

Further, in the above-mentioned cases, at least the main portion of the "lock apparatus" is constructed by the latch assembly 20, the key cylinder assembly 30 and the key cylinder rod 35, however, the present invention is not limited to the tail gate 10 in which such a mechanical type locking mechanism is provided, and the present invention can be effectively applied to a structure provided with a so-called keyless entry system, passive keyless entry system or the like, which directly drives a latch driving actuator of the latch assembly in accordance with a remote control utilizing a wireless communication means or the like so as to switch the lock and unlock states of the latch assembly.

Further, in the above-mentioned cases, the "lock apparatus" is arranged between the inner panel and the inner cover of the tail gate, however, in place thereof, the lock apparatus can be arranged between the outer panel and the inner panel. In this case, the protection wall can be formed so as to integrally protrude from the inner side of the outer panel.

As described above, the present invention is not limited to the embodiments mentioned above, and it goes without saying that various modifications and changes in design can be carried out without departing from the gist of the present invention.

What is claimed is:

1. A structure of a tail gate formed by bonding peripheral edge portions and their vicinities of an inner panel and an outer panel to each other, and covering a rear portion of a vehicle body so as to freely open and close,
   wherein a cover is arranged in an inner side of said inner panel,
   a lock apparatus is disposed between said inner panel and said cover, said lock apparatus including a latch capable of engaging with a striker fixed to the vehicle body, and
   an outer handle assembly is mounted to said inner panel.

2. A structure of a tail gate as claimed in claim 1,
   wherein said lock apparatus is provided with a latch assembly and a key cylinder assembly connected to said latch assembly via a key cylinder rod, said latch assembly including said latch,
   said key cylinder rod is substantially extended between the key cylinder assembly and the latch assembly within a space between the inner panel and the cover, and
   said key cylinder assembly is mounted to said inner panel.

3. A structure of a tail gate formed by bonding peripheral edge portions and their vicinities of an inner panel and an outer panel to each other, and covering a rear portion of a vehicle body so as to freely open and close,
   wherein a cover is arranged in an inner side of said inner panel,
   a lock apparatus is disposed between said inner panel and said cover, said lock apparatus including a latch capable of engaging with a striker fixed to the vehicle body, and
   vertical walls protruding at least from any one of said inner panel and the outer panel are disposed at both sides of said latch in a widthwise direction of the vehicle body.

4. A structure of a tail gate formed by bonding peripheral edge portions and their vicinities of an inner panel and an outer panel to each other, and covering a rear portion of a vehicle body so as to freely open and close,
   wherein a cover is arranged in an inner side of said inner panel,
   a lock apparatus is disposed between said inner panel and said cover, said lock apparatus including a latch capable of engaging with a striker fixed to the vehicle body, and
   a cover wall extending between said latch assembly and the outer panel is disposed in a rear side of said latch in a longitudinal direction of the vehicle body.

5. A structure of a tail gate as claimed in claim 1, wherein a support portion for supporting said key cylinder assembly is provided at least in any one of said inner panel and the cover.

6. A structure of a tail gate formed by bonding peripheral edge portions and their vicinities of an inner panel and an outer panel to each other, and covering a rear portion of a vehicle body so as to freely open and close,
   wherein an opening portion for mounting a license lamp unit is formed at least in any one of said inner panel and the outer panel, said license lamp unit being detachably mounted to said opening portion,
   a lock apparatus, provided with a latch assembly having a latch capable of engaging with a striker fixed to a vehicle body and a key cylinder assembly connected to said latch assembly via a key cylinder rod extending in an inner side at least from said outer panel, is arranged at least in an inner side of said outer panel,
   a protection wall for regulating an access to said key cylinder rod is provided between said opening portion and said key cylinder rod, and
   said protection wall is provided with a pair of left and right standing walls protruding from both of left and right sides of said opening portion toward the inner side of the tail gate, and a standing wall protruding at least from a side corresponding to said key cylinder rod in both of the upper and lower sides of said opening portion toward the inner side of the tail gate.

7. A structure of a tail gate formed by bonding peripheral edge portions and their vicinities of an inner panel and an outer panel to each other, and covering a rear portion of a vehicle body so as to freely open and close,
   wherein an opening portion for mounting a license lamp unit is formed at least in any one of said inner panel and the outer panel, said license lamp unit being detachably mounted to said opening portion,
   a lock apparatus, provided with a latch assembly having a latch capable of engaging with a striker fixed to a vehicle body and a key cylinder assembly connected to said latch assembly via a key cylinder rod extending in an inner side at least from said outer panel, is arranged at least in an inner side of said outer panel,
   a protection wall for regulating an access to said key cylinder rod is provided between said opening portion and said key cylinder rod, and
   said protection wall is provided with a standing wall extending substantially along said key cylinder rod at least in a side corresponding to said opening portion of said key cylinder rod, and protruding toward the inner side of the tail gate.

8. A structure of a tail gate as claimed in claim 1, wherein said inner panel and the outer panel are made of a synthetic resin.

9. A structure of a tail gate as claimed in claim 5, wherein said support portion comprises a reinforcement rib provided on any one of the inner panel and the cover.

* * * * *